United States Patent [19]

Burdick

[11] Patent Number: 5,268,466
[45] Date of Patent: Dec. 7, 1993

[54] WATER SOLUBLE POLYMER SUSPENSIONS IN DIBASIC POTASSIUM PHOSPHATE

[75] Inventor: Charles L. Burdick, Landenberg, Pa.

[73] Assignee: Aqualon Company, Wilmington, Del.

[21] Appl. No.: 794,425

[22] Filed: Nov. 20, 1991

[51] Int. Cl.$^5$ .................... C08L 1/08; C08K 3/00; C07G 17/00; C08B 37/00
[52] U.S. Cl. ..................... 536/114; 106/171; 106/194; 148/251; 536/123; 524/416; 524/423
[58] Field of Search ............. 536/114, 123; 106/194, 106/170, 171; 148/6.15, 251; 435/101

[56] References Cited

U.S. PATENT DOCUMENTS

| | | | |
|---|---|---|---|
| 4,283,229 | 8/1981 | Girg et al. | 106/171 |
| 4,883,536 | 11/1989 | Burdick | 106/194 |
| 4,883,537 | 11/1989 | Burdick | 106/194 |

*Primary Examiner*—Michael C. Wityshyn
*Assistant Examiner*—Louise N. Leary

[57] ABSTRACT

Aqueous suspensions of hydroxyethylcellulose, carboxymethylcellulose, methylcellulose, methylhydroxypropylcellulose, 1-(butoxy)-2-hydroxypropylhydroxyethylcellulose, ethylhydroxyethylcellulose, hydrophobically modified hydroxyethylcellulose, methylhydroxypropylcellulose, guar gum, carboxymethylhydroxypropylguar, hydroxypropylguar and carboxymethylguar in dibasic potassium phosphate are stabilized with xanthan gum to provide improved thickeners for joint compounds and latex paint.

5 Claims, No Drawings

WATER SOLUBLE POLYMER SUSPENSIONS IN DIBASIC POTASSIUM PHOSPHATE

FIELD OF THE INVENTION

The invention relates to salt suspensions of polymer in water. In particular, the invention relates to polysaccharide polymer suspensions in concentrated aqueous solutions of dibasic potassium phosphate.

BACKGROUND OF THE INVENTION

U.S. Pat. No. 4,283,229 (Girg et al.) discloses that stable suspensions of nonionic cellulose ethers can be prepared in a solution of 4 to 12% electrolyte if alumina is added to the suspension. Prior art aqueous fluid suspensions of water soluble polymers are further described in U.S. Pat. Nos. 4,883,536 and 4,883,537. U.S. Pat. No. 4,883,536 covers the use of ammonium salts such as diammonium sulfate (DAS), diammonium phosphate (DAP) and ammonium polyphosphate for preparing fluid suspensions of water soluble polymers. U.S. Pat. No. 4,883,537 covers the use of concentrated aqueous potassium carbonate for preparing suspensions of sodium carboxymethylcellulose.

The art of U.S. Pat. No. 4,883,536 is limited in that the compositions described all contain ammonium ion. This chemical species is disadvantageous due to the possible release of small amount of ammonia when incorporated into a number of end use applications such as joint compound or paint. In contrast to this, the present invention does not contain ammonium ion and thus can not generate undesirable fumes in end use applications.

The art of U.S. Pat. No. 4,883,537 describes suspensions of water soluble polymers in concentrated aqueous potassium carbonate media. The drawback to this latter prior art technology is that suspensions prepared according to this art exhibit very high pH (greater than 12.5). The high pH of this prior art is severely limiting since the use of such a thickening agent can cause adverse reactions. In addition, the high pH of this prior art thickener makes it a hazardous material requiring extreme caution in handling. In contrast to this, the present invention exhibits a moderate pH of about 9.0 that is acceptable for use in a number of applications where the prior art may be precluded from use.

SUMMARY OF THE INVENTION

An object of the invention is to provide an improved suspension of water-soluble polymers in a concentrated aqueous salt solution. This composition-of-matter consists of three essential components: water, dibasic potassium phosphate and a non-ionic or anionic water-soluble polymer. A minor amount of a stabilizing agent such as sodium alginate, CMC or xanthan may also be added to the suspension to provide long term stability and to prevent settling.

The compositions include either nonionic or anionic water soluble polymers dispersed in an amount equal to or greater than 20% by weight in an aqueous medium containing not less than 12% $K_2HPO_4$ by weight based on the total suspension weight.

DETAILED DESCRIPTION OF THE INVENTION

It was discovered that suspensions of water soluble polymers in concentrated aqueous dibasic potassium phosphate provide a composition more useful as a liquid thickening agent in many application than ones of the prior art.

The nonionic and anionic water-soluble polymers found to be operable in the present invention include methylhydroxypropylcellulose, hydroxyethylcellulose, methylcellulose, 1-(butoxy)-2-hydroxypropylhydroxyethylcellulose, carboxymethylcellulose, ethylhydroxyethylcellulose, carboxymethylhydroxyethylcellulose, hydrophobically modified hydroxyethylcellulose, guar gum, hydroxypropylguar, carboxymethylguar and methylhydroxyethylcellulose. It is thought that a number of other water soluble polymers would also be operable in the present invention.

Suspensions of water soluble polymers in compositions of the present invention that utilize dibasic potassium phosphate were found to perform more effectively in applications such as joint compounds and paint compared to suspensions of water-soluble polymers prepared according to the prior art that incorporated salts such as ammonium sulfate, ammonium phosphate or potassium carbonate.

The invention has industrial applicability in construction and coating materials such as joint compounds and latex paints. All parts and percentages in the following examples are by weight unless otherwise indicated.

EXAMPLE 1

A fluid suspension of Natrosol® 250GR hydroxyethylcellulose (available from Aqualon) was prepared according to the present invention by adding 59.8 parts by weight of water to a mixing vessel then dissolving in sequence 1.0 parts of CMC-7L1T sodium carboxymethylcellulose (available from Aqualon), then 14.2 parts by weight of dibasic potassium phosphate (DPP). After the DPP had dissolved, 25 parts by weight of Natrosol 250GR was added to the suspension and stirred to disperse. A stable fluid suspension was obtained with a Stormer viscosity of 107 Krebs Units.

For comparative purposes, a suspension of Natrosol® hydroxyethylcellulose was prepared according to the art in U.S. Pat. No. 4,883,536. In this latter case, 59.8 parts by weight CMC-7L1T, 14.2 parts of diammonium phosphate (DAP) and 25 parts of Natrosol 250GR HEC were added in sequence in the same manner as above. In this case, a fluid suspension with a Stormer viscosity of 97 Krebs Units was obtained.

It was shown by the above experiments that dibasic potassium phosphate and DAP were very similar with respect to effectiveness in preparing fluid suspensions of hydroxyethylcellulose.

Paints were prepared which incorporated each of the above suspensions. Tests were conducted with a 63 PVC interior flat paint formulation. This formulation is given in the appendix of Aqualon Brochure 250-18A, formulation IUF 70-2151.

Standardized application tests were conducted with the paints prepared incorporating the thickening agent of the present invention, designated 0135-99-2, as well as the prior art thickener 0135-99-1. The results from these tests are shown in Table 1. It was found that a paint incorporating the fluidized polymer suspension 0135-99-2 of the present invention exhibited a higher scrub value in standard paint panel scrub tests that the paint that incorporated the fluidized suspension 0135-99-1 of the prior art. It was also found that the paint made with 0135-99-2, the thickener of the present invention, showed no ammonia odor while the paint prepared with the prior art fluidized polymer suspension 0135-99-1 had a slight, but undesirable, ammonia odor.

It was thus shown that the present invention, a fluid suspension of a water soluble polymer in an aqueous medium containing dissolved dibasic potassium phosphate, had improved utility for thickening flat latex paints compared to a fluid suspension of the same water-soluble polymer prepared according to the prior art.

EXAMPLE 2

A suspension of 1-(butoxy)-2-hydroxypropylhydroxyethylcellulose (HMHEC-B available from Aqualon) was prepared according to the present invention by dissolving 0.2 parts of xanthan gum in 63.7 parts water, then dissolving 16 parts of dibasic potassium phosphate into the xanthan solution, and finally dispersing 20 parts of HMHEC-B into the solution. In addition, 0.1 parts of Proxel® GXL preservative was added to the final suspension. The homogeneous fluid suspension was designated 0195-3-4.

For comparative purposes an alternative suspension of HMHEC-B was prepared with diammonium phosphate (DAP) substituted for dibasic potassium phosphate in the same procedure employed above. The resulting suspension was similar in characteristics compared to the above suspension of the present invention. This product was given the designation 0195-3-2.

As a second comparative example, diammonium sulfate (DAS) was substituted for dibasic potassium phosphate in the above formulation and a like fluid suspension was obtained. This product was given the designation 0195-3-3.

As a third comparative example, potassium carbonate (PC) was substituted for dibasic potassium phosphate in the above formulation and a fluid suspension was obtained, with the designation of 0195-3-1.

These tests show that various salts named in the prior art U.S. Pat. Nos. 4,883,536 and 4,883,537 were capable of preparing fluid suspensions of HMHEC-B in aqueous media. It was found in further tests, however, that when each of these products was employed in joint compound preparation, undesirable performance properties were observed whereas the present invention, a suspension of water soluble polymer in concentrated aqueous dibasic potassium phosphate gave superior performance in this application as is described below.

In the tests conducted, joint compounds were prepared with each of the above fluidized polymer suspensions at equal active polymer dosage. The joint compounds were prepared by adding 231 parts by weight of water to a Hobart mixer then adding sequentially, with stirring, 2.8 parts by weight of propylene glycol, 0.4 parts preservative, 23 parts by weight of propylene glycol, 0.4 parts of preservative, 23 parts by weight of UCAR® 133 (Union Carbide) latex, 0.33 parts by weight of Nopco® PD-1 defoamer, 489 parts of Georgia White #9 calcium carbonate, 13.3 parts of gel B attapulite clay, 20 parts by weight of Mica P-80K, and finally 20 parts by weight of fluidized polymer suspension. The joint compounds were mixed for 5 minutes with one scrape down and placed into storage containers.

The joint compound properties obtained with each of the four fluidized polymer thickening agents, including joint compound viscosity, adhesion and odor were then evaluated and compared as shown in Table 2.

It was observed that the prior art fluid suspensions of HMHEC-B utilizing ether DAS or DAP salts according to the prior art produced unacceptable ammonia odor in the joint compounds that contained these agents. In indoor construction environments, the strong noticeable odor liberated by these joint compounds would be unacceptable and thus these fluidized polymer suspensions prepared according to the prior art would have little utility for use in this application.

In other joint compound tests, it was found that a joint compound prepared incorporating 0195-3-1, a fluidized polymer suspension prepared with potassium carbonate according to the prior art of U.S. Pat. No. 4,883,537, gave unacceptably poor adhesion to joint compound taping paper in standard laboratory tests. By comparison, the adhesion of the joint compound thickened with 0195-3-4, the thickener of the present invention, was found to be acceptable.

The poor results for each of the prior art fluid suspensions of the HMHEC-B in the joint compound application showed that this prior art had no practical utility for use as joint compound thickening agents. By comparison, the present invention, a fluid suspension of water soluble polymer in aqueous media containing dissolved dibasic potassium phosphate, was shown to exhibit viable performance in the joint compound application.

EXAMPLE 3

A sample of CMC-7M8SXF (available from Aqualon) was prepared in fluid suspension form according to the present invention by first dissolving 0.5 parts of Kelgin LV sodium alginate in 40 parts water, then adding sequentially with stirring 39.5 parts of dibasic potassium phosphate, stirring to dissolve, then adding 20 parts by weight of CMC-7M8SXF. The so-prepared product was a fluid suspension with a Stormer viscosity of 115 Krebs units and a pH of 9.8.

For comparative purposes, a suspension was prepared according to the art of U.S. Pat. No. 4,883,537. In this latter case, 0.5 parts by weight of Kelgin LV was dissolved in 40 parts of water then 39.5 parts of potassium carbonate was dissolved in the water with stirring and 20 parts of CMC-7M8SXF was added with stirring to disperse. In this latter case, the fluid suspension of the CMC-7M8SXF was observed with a viscosity of 110 Krebs units and a pH of 12.9.

In this example, it was shown that the present invention and the prior art of U.S. Pat. No. 4,883,537 could be employed to prepare a fluid suspension of CMC-7M8SXF. However, it was shown that the present invention was superior to the prior art in exhibiting a lower, less hazardous pH. It was attempted to reduce the pH of the suspension containing potassium carbonate to 10.0 with the addition of acetic acid, however, this resulted in the gelation of the sample at pH 11.

EXAMPLE 4

A series of suspensions of CMC-7M8SXF were prepared in concentrated aqueous dibasic potassium phosphate media in which the ratio of $K_2HPO_4$ was varied according to the compositions shown in Table 3. It was found in these tests that ratios of 20–40% $K_2HPO_4$ salt in water did not produce fluid suspensions of the CMC but that thick gels were observed. It was found that a relatively high dibasic potassium phosphate ratio of 50% salt/salt+water was required to prepare a fluid suspension of the CMC 7M8SXF.

For comparative purposes, it was attempted to prepare a suspension of CMC-7M8SXF in the prior art salt of ammonium phosphate dibasic. However, as shown in the table, it was found that it was not possible to prepare a 20% by weight fluid suspension of CMC in aqueous diammonium phosphate even at high concentration.

This example distinguishes the dibasic potassium phosphate salt from the prior art salt diammonium phosphate for preparing fluid suspensions of CMC.

EXAMPLE 5

A series of fluid suspensions were prepared by first dissolving 0.2 parts of xanthan in 59.8 parts of water, then dissolving 20 parts of dibasic potassium phosphate in the water and finally adding in 20 parts of water soluble polymers and stirring to disperse. The various water soluble polymers that were screened in this suspension recipe included hydroxypropylcellulose, Natrosol® Plus type 330 hydrophobically modified hydroxyethylcellulose (Aqualon), Culminal® MC methylcellulose 20,000 PR (Aqualon), and Polyox 301 polyethylene oxide (Union Carbide). In all cases, fluid pourable suspension were observed that showed no indication of polymer settling for greater than 3 weeks' storage time. When added to dilution water, each of these fluid polymer suspensions was observed to thicken readily. This example showed the broad utility of the present invention in preparing functional fluid suspensions of a number of water soluble types.

EXAMPLE 6

Data obtained from the previous examples was compiled into the tables which follow:

TABLE 1

Paint Performance Test Results For Flat Paint Containing Fluidized Polymer Suspension Thickeners

| | Paint Thickener | |
| --- | --- | --- |
| | 0135-99-1 | 0135-99-2 |
| Salt Type | diammonium phosphate | dibasic potassium phosphate |
| Paint Properties | | |
| Thickener Dosage | 0.93% active | 0.93% active |
| ICI Viscosity | 86 KU | 89 KU |
| Sag, mm | 21 | 21 |
| Spatter (subjective) | 5 | 4 |
| Scrub Cycles Till Failure | 100 | 129 |
| Odor | noticeable ammonia | No ammonia |

TABLE 2

Joint Compound Test Results for Various Fluidized Water Soluble Polymer Suspensions

| Joint Compound Properties | Thickener | | | |
| --- | --- | --- | --- | --- |
| | 0195-3-1 | 0195-3-2 | 0195-3-3 | 0195-3-4 |
| Viscosity Brabender Units | 600 | 510 | 560 | 550 |
| Odor | Ammonia | Ammonia | No ammonia | No ammonia |
| Adhesion | Good | Good | Poor | Good |

TABLE 3

Suspensions of CMC-7M8SXF in Aqueous Solutions Containing Dissolved Diammonium Phosphate or Dibasic Potassium Phosphate

| | Test No. | | | | |
| --- | --- | --- | --- | --- | --- |
| | 1 | 2 | 3 | 4 | 5 |
| Ingredients: | | | | | |
| Water (grams) | 60 | 60 | 50 | 50 | 80 |
| $K_2HPO_4$ (grams) | 40 | — | 50 | — | 20 |
| $(NH_4)_2HPO_4$ (grams) | — | 40 | — | 50 | — |
| CMC-7M8SXF (grams) | 25 | 25 | 25 | 25 | 25 |
| Observations | Thick Paste | Thick Paste | Fluid Pourable Dispersion | Thick Gel | Thick Gel |

What is claimed is:

1. A suspension of an anionic or nonionic water soluble polysaccharide selected from the group consisting of hydroxyethylcellulose, methylcellulose, 1-(butoxy)-2-hydroxypropylhydroxyethylcellulose, hydrophobically modified ethylhydroxyethylcellulose, ethylcellulose, methylhydroxypropylcellulose, carboxymethylhyroxyethylcellulose, hydrophobically modified hydroxyethylcellulose, guar gum, hydroxypropylguar, carboxymethylguar, carboxymethylhydroxypropylguar and methylhydroxyethylcellulose in an aqueous solution of 12 to 40% by weight dibasic potassium phosphate.

2. The suspension of claim 1 comprising 15-30% by weight of said polysaccharide.

3. The suspension of claim 2 further comprising a stabilizing amount of xanthan gum.

4. The suspension of claim 3 where the polysaccharide is hydrophobically modified hydroxyethylcellulose.

5. The suspension of claim 3 where the polysaccharide is 1-(butoxy)-2-hydroxypropylhydroxyethylcellulose.

* * * * *